J. A. STEINMETZ.
METAL CASK.
APPLICATION FILED MAR. 14, 1912.
1,060,035.
Patented Apr. 29, 1913.
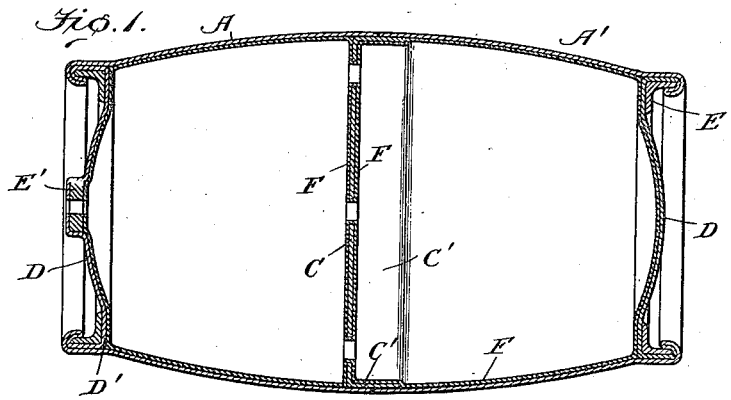
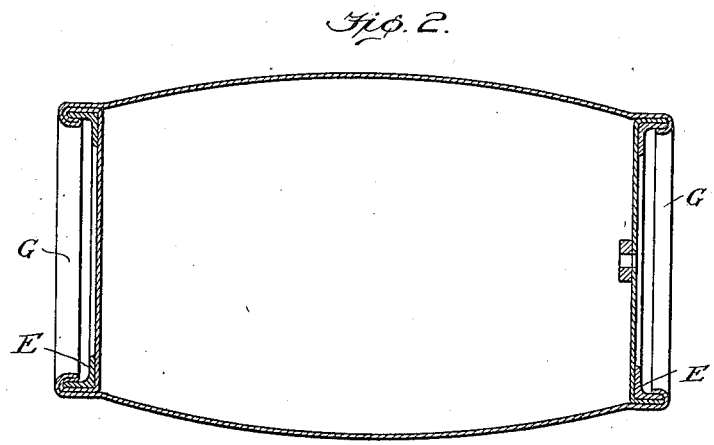
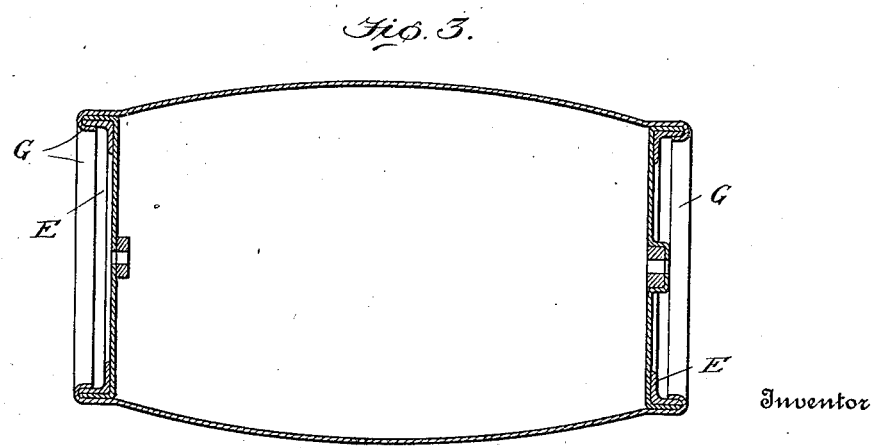
Witnesses
Edwin L. Bradford
Robert Craig Greene
Inventor
Joseph A. Steinmetz
By Wallace Greene,
Attorney

UNITED STATES PATENT OFFICE.

JOSEPH A. STEINMETZ, OF PHILADELPHIA, PENNSYLVANIA.

METAL CASK.

1,060,035.

Specification of Letters Patent.  Patented Apr. 29, 1913.

Application filed March 14, 1912. Serial No. 683,668.

*To all whom it may concern:*

Be it known that I, JOSEPH A. STEIN-METZ, citizen of the United States, residing at Philadelphia, in the county of Philadelphia and State of Pennsylvania, have invented certain new and useful Improvements in Metal Casks, of which the following is a specification, reference being had therein to the accompanying drawing.
My invention relates to metal barrels and the like, and its general object is to combine low cost with great strength and other advantages.

One feature of the invention pertains to a construction making it practically impossible to injure the chime of the cask by any ordinary rough usage, another feature to providing the cask with one or more transverse diaphragms securing rigidity and strength in all forms and perfection in manufacture in certain constructions, and a third feature involves, in the preferred construction, securing a cask without external offsets or projections on the body of the cask.

In the accompanying drawings, Figure 1 shows in diametrical section a barrel having the body and heads made up of two oppositely turned, seamless cup-like members, preferably joined by welding and having the joint internally reinforced and the body walls centrally supported by an internal transverse diaphragm. Fig. 2 is a similar sectional view showing the body and one head formed in one piece while the other head is primarily distinct. Fig. 3 similarly shows a one-piece body with both heads inserted.

In Fig. 1, A, A' represents two oppositely turned, cup-shaped halves of a barrel, each formed from a single sheet of metal outwardly beveled at its margin and abutting the companion margin, the V-shaped channel thus formed being filled and the two parts integrally united by metal. This connecting metal is usually supplied by placing a bar in the groove and progressively fusing it electrically or otherwise. Before the two halves are thus joined, however, I place in the open end of one a diaphragm C of circular form provided with a marginal flange C' which projects about half its own width when the diaphragm has been forced into the cup to proper position. Over this projecting portion, the other cup is forced, to meet the companion cup. These parts may be brazed or welded together before the channel between the cups is filled in the manner already described. The outer end of each cup has its walls bent back upon themselves so that the head lies in a plane at some distance within the extreme limits of the body walls and the central portion of the head is preferably pressed outward to form a central boss D surrounded by a plane annular portion D'. Into the projecting doubled portion of the body wall is pressed a heavy metal ring E in cross section like an angle bar thickened near the angle so that it may offer great resistance to any change of the angle. One broad flange of this ring rests against and covers the plane annular portion of the head while the other flange fits within the projecting doubled portion of the body walls, which are bent inwardly against this flange, so that the margin of the latter is held and protected by a rounded rib made up of four thicknesses of the wall metal. One of the heads is pressed out centrally to form a recess for receiving a centrally perforated block E' which is internally flush with the head and which serves for holding a bung or closure inserted from without through a corresponding perforation in the bottom of the recess. When the barrel is thus far completed, it is provided with an interior coating or lining, F, preferably of metal. Ordinarily, the diaphragm is provided with apertures so that the spaces on each side are in communication.

It may be observed that in making the cask, the flanged diaphragm insures bringing the cup margins into exact circular form with the surfaces to be brazed or welded accurately adjusted on all sides so that the brazed or welded joint is perfectly made at all points and the barrel is never flattened in making. It is also obvious that the flange doubles the metal at the joint, making this part the strongest instead of the weakest, and that the diaphragm itself makes it practically impossible to crush or even spring the barrel near the middle.

It is of perhaps greater importance that the barrel can hardly be injured by force applied to the chime in any direction, even if the barrel be held in oblique position and then be dropped from a considerable height.

This strength is due partly to the stiffness of the four-ply wall metal, partly to the stiffness of the reinforcing ring, and partly to the fact that the broad flange of the ring transmits force to the head and distributes it widely. It is also important that even in case extraordinary force should be applied and the parts should be temporarily or permanently distorted, there is no sharp angle at which actual rupture is likely to occur and cause leakage.

In Fig. 2 both heads are shown as plane, one being integral and formed and reinforced as before, while the other is flanged, forced into place, reinforced by the same kind of ring E, and preferably brazed or welded in place, the head flange and ring flange being covered, somewhat as before, by bending the terminal portion G of the body wall inward. Fig. 3 shows both heads of the barrel connected to the body as shown at the right hand end in Fig. 2. In any of the forms the welding may be done electrically, by the use of the oxy-acetylene method, or otherwise, as may be found desirable or convenient.

While receptacles made in accordance with this invention may replace ordinary light and inexpensive casks, they are especially adapted, when of proper thickness and material, for containing liquids under high tension, as well as those of a dangerous character aside from their tension, for example certain chemicals, oils and liquids.

What I claim is:

1. The combination with a metal cask body made up of two oppositely turned cup-like members welded together marginally, of a transverse metal diaphragm having a peripheral flange fitting against the interior of both said members and connected to both by metal continuous with the metal of both.

2. The combination with a metal cask body made up of two oppositely turned meeting cup-like members of the same marginal diameter, of a transverse metal diaphragm covering internally the joint between the two members, said members being connected at their meeting margins with each other and with the diaphragm by metal continuous with the metal of all three members.

3. The combination with metal cask walls doubled back upon themselves at the cask ends and integrally connected with a cask head of a broad ring resting upon and covering the peripheral portion of the head and having an approximately cylindrical flange fitting within the doubled portion of said walls, said doubled portion being bent back upon itself to thereby embrace the outer or marginal portion of said flange.

In testimony whereof I affix my signature in presence of two witnesses.

JOSEPH A. STEINMETZ.

Witnesses:
   ANSON B. EVANS,
   EDITH A. STEINMETZ.